(No Model.)
F. M. ASHLEY.
BRAKE SYSTEM.
No. 587,691. Patented Aug. 10, 1897.
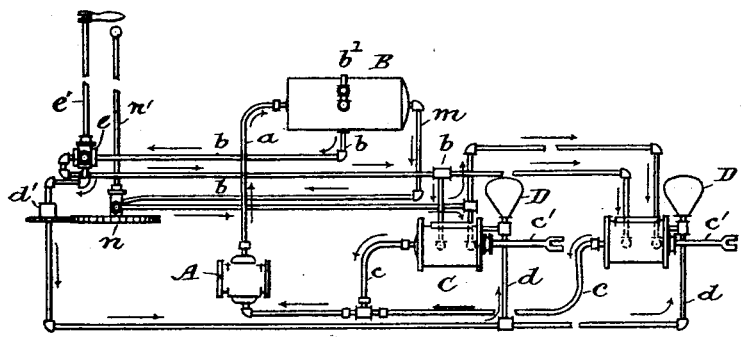
Witnesses:
E. B. Bolton
George A. Ryan
Inventor.
Frank M. Ashley
By Edwards, Ryan & Lawyer
his Attorneys.

UNITED STATES PATENT OFFICE.

FRANK M. ASHLEY, OF HAWTHORNE, NEW JERSEY.

BRAKE SYSTEM.

SPECIFICATION forming part of Letters Patent No. 587,691, dated August 10, 1897.

Application filed June 18, 1895. Serial No. 553,207. (No model.)

*To all whom it may concern:*

Be it known that I, FRANK M. ASHLEY, a citizen of the United States, and a resident of Hawthorne, in the county of Passaic and State of New Jersey, have invented certain new and useful Improvements in Brake Systems, of which the following is a specification.

This invention relates to brake systems, and is particularly applicable to those operated by air or fluid pressure.

The object of the invention is to construct a strong, flexible, and economical brake system which shall at all times be regular and positive in action.

The invention also comprehends the utilization of the outside atmosphere and the momentum of the car itself to operate the brakes.

In the accompanying drawing the figure represents a perspective view of my invention.

Describing my said invention with reference to the drawing herein, A is an air or fluid pump, preferably adapted to be set in motion by the movement of the car, though it will be seen more clearly hereinafter that other equivalent means of operating the pump may be employed. B is a reservoir in which is stored air or fluid under pressure, the reservoir being provided with a safety-valve $b'$ to prevent bursting. The air or fluid is pumped into the reservoir through pipe $a$, leading thereto from the outlet of the pump. C is the brake-cylinder, and $c$ is a pipe leading from one end of the brake-cylinder to the inlet of the pump. Pipe $b$ leads from the reservoir to the same end of the brake-cylinder against which force is exerted to release the brakes. The piston-rod of the brake-cylinder, which operates to apply the brakes, is represented by $c'$, as shown in the drawing, the brake being off. The brakes are applied by drawing the piston-rod into the cylinder. D represents a compression-chamber similar to that described in my application for patent, Serial No. 553,206, filed June 18, 1895, and connected with the brake-cylinder in the manner described therein. This chamber is also connected with the outside atmosphere by a pipe $d$, the opening of which is controlled by a valve, as will be presently described.

Communication from pipe $d$ to the atmosphere is permitted under certain conditions by a valve $e$, controlled by handle $e'$. In the drawing the valve $e$ is illustrated as being arranged to control the passage of liquid through pipe $b$, intermediate the reservoir and the brake-cylinder. This may be accomplished, among other ways, by the use of a four-way valve so arranged that when passage through pipe $b$ is open communication with the atmosphere will be closed.

In operation the reservoir B is stored with air or liquid under pressure, and valve $e$ is turned so that the passage-way through pipe $b$ will be open. When the car moves, therefore, a circulation of the air or fluid will be established from reservoir B through pipe $b$, valve $e$, pipe $b$, brake-cylinder C, pipe $c$, pump A, and pipe $a$ into the reservoir. As long as this circulation continues the pressure in the end of the brake-cylinder is sufficient to hold the piston at the end of its stroke and keep the brakes off. When valve $e$ is turned so that the passage-way through pipe $b$ is closed the air or fluid cannot escape from the reservoir, and the air or fluid remaining in pipe $b$, between valve $e$ and the brake-cylinder, the end of the brake-cylinder C, and pipe $c$, is pumped therefrom back into the reservoir. This creates a vacuum in the end of the brake-cylinder, and the air from the outside atmosphere rushing in through pipe $d$, the entrance thereto being opened by the closing of the valve in pipe $b$, enters the opposite end of the brake-cylinder and throws the piston-rod to the other end of the cylinder, which applies the brakes. When the valve $e$ is turned, closing pipe $d$ and opening pipe $b$, the air or fluid is again allowed to enter the cylinder from the reservoir B and throws the piston-rod back to its normal position.

As an auxiliary to the system above described I have added the following: A pipe $m$ leads from the reservoir B to the end of the brake-cylinder which is opened to the outside atmosphere to apply the brakes. This pipe $m$ is provided with a cut-off valve $n$, which is operated by a valve-stem $n'$, and pipe $d$ is provided with a cut-off valve $d'$. These valves are connected by gearing or in any other suitable manner, so that when valve $n$ is opened valve $d'$ will be closed. Should there then be any break or refusal of the system to work, the pressure may be turned into the brake-cylinder direct from the reservoir and the brakes applied thereby.

It may also be noted that with the addition just described upon closing the passage through pipe $b$ and opening that through pipe $m$ the pump will force the fluid through the reservoir through pipe $m$ into cylinder C, and there then being no outlet through pipe $d$ the brakes will be applied.

It is to be understood that the term "reservoir" as used herein and in the claims is intended to include the system of piping as well as the tank B.

I do not herein limit myself to the precise construction shown and described, as the same may obviously be varied to suit convenience.

Having thus described my invention, I claim—

1. In a brake system, means operated by the momentum of the car and adapted to create pressure on one side of the piston in the brake-cylinder, and to withdraw said pressure; in combination with means to create pressure on the opposite side of the piston, substantially as described.

2. In a brake system, means operated by the momentum of the car and adapted to create pressure on one side of the piston in the brake-cylinder and to withdraw said pressure; in combination with means for creating a pressure of the outside atmosphere upon the opposite side of the piston to apply the brakes, substantially as described.

3. In a brake system, the combination with a reservoir of devices for withdrawing pressure from one side of the brake-cylinder, devices for introducing normal atmospheric pressure into the opposite side, and devices for supplementing the atmospheric pressure with pressure from the reservoir, for the purpose set forth.

4. In a brake system, the combination with an air or fluid pump, an independent reservoir, and an independent brake-cylinder, of a system of circulation passing successively through or in open communication with said pump, reservoir and brake-cylinder, means for causing said pump to withdraw the circulation from the brake-cylinder and force it into the reservoir, and means for creating a pressure in the opposite end of the brake-cylinder, substantially as described.

5. In a brake system, the combination with the pump, brake-cylinder and reservoir, of a system of piping between the brake-cylinder and pump, pump and reservoir, and the reservoir and each end of the brake-cylinder, and a valve or valves in said piping whereby when communication is open between the reservoir and pressure end of the brake-cylinder, communication between the reservoir and opposite end of the brake-cylinder, and between the pressure end of the brake-cylinder and the atmosphere, will be closed, substantially as described.

Signed at New York, in the county of New York and State of New York, this 9th day of April, A. D. 1895.

FRANK M. ASHLEY.

Witnesses:
EDWARD K. STURTEVANT,
C. V. EDWARDS.